Oct. 6, 1953    H. T. YOUNGREN ET AL    2,654,261
DOUBLE COUNTERSHAFT TRANSMISSION
Filed June 11, 1949

Inventors:
Harold T. Youngren and
Sidney V. Hettinger, Jr.
By

UNITED STATES PATENT OFFICE 2,654,261

DOUBLE COUNTERSHAFT TRANSMISSION

Harold T. Youngren, Birmingham, Mich., and Sidney V. Hettinger, Jr., Westchester, Ill., assignors to Borg-Warner Corporation, Chicago, Ill., a corporation of Illinois Application June 11, 1949, Serial No. 98,593

6 Claims. (Cl. 74—336)

The present invention relates to transmissions designed for use in connection with automotive vehicles and more particularly to a type of transmission in which the changes in gear ratio are provided by mechanisms having individual clutches which are selectively operable to produce the various gear ratios.

Reference is hereby made to, and cognizance should be taken of, our copending applications for patents, Serial Nos. 98,591 and 98,592, now Patent 2,599,801, both filed June 11, 1949, which disclose subject matter similar to that disclosed herein.

It is among the principal objects of the invention to provide a means for operating a transmission in which an uninterrupted flow of power from the engine is applied through the transmission during speed changes, thus giving faster and smoother pick-up as well as requiring less time to get the vehicle up to the desired speed.

Conversely, it is an object of the invention to provide a transmission which operates during deceleration of the vehicle through the various gear ratios to likewise maintain a continuous operative driving connection between the vehicle engine and the propelling means for the vehicle, thus rendering such deceleration more uniform while at the same time preventing the vehicle from getting out of engine control.

A further object of the invention is to provide a transmission particularly adapted for use in automotive vehicles in which the various gear ratios between the engine and the rear or drive axle are controlled by individual clutches which cause the engine power to be diverted through the proper gears to obtain the desired ratios.

In carrying out the above-mentioned objects, the invention contemplates the provision of two separate and independent friction clutches and five positive clutches in which each one of the five positive clutches, when connected in series with one of the two friction clutches, serves to complete one of five power train drives of which the transmission is capable, these power trains representing respectively first, second, third, fourth and reverse gear ratios between the driving shaft and driven shaft of the transmission. The two friction clutches, therefore, are sufficient to provide operation for four forward speed gear ratios and for one reverse speed gear ratio. The five positive clutches which are selectively employed, each in combination or in series with one or the other of the two friction clutches as the case may be, may be manually operable but preferably they are automatically operable to thus provide, at least in part, automatic operation for the five possible gear ratios.

The various positive clutches preferably include so-called synchronizing mechanism which brings one rotating member up to the rotative speed of another before effecting a connection between them, thus completing the connection without objectionable clashing of gears. The automatic means for operating the various positive clutches as well as the specific nature of the synchronizing devices form no part of this invention and no claim is made herein to any novelty associated with the same. As a consequence, the only disclosure which has been made herein of the automatic operating means and synchronizing devices has been the diagrammatic disclosure necessary to an understanding of the invention. The two friction clutches are capable of either manual or automatic operation and the disclosure of the means for operating them is likewise diagrammatic.

The provision of a transmission of the character briefly outlined above being one of the principal objects of the invention, more specifically it is a further object to provide a compact transmission unit adapted for automatic operation in which a pair of friction clutches are engaged alternately to establish driving connections through a plurality of gear trains to effect four different forward speed gear ratios and one reverse speed gear ratio and also to provide a means which will permit automatic alteration of the gear ratio through progressively increasing or decreasing ratios by selectively conditioning certain of the gear trains for subsequent operation while another one is in actual operation.

A still further object of the invention is to provide a transmission of this character in which alternate operation of the two clutches provided is preceded by the preconditioning of certain selecting devices without interruption of the power flow from the engine through the transmission preparatory to effecting a shift in gear ratio from a low ratio to a higher one or vice versa.

Yet another and important object of the invention is to provide a transmission having a plurality of separate and independent positive clutches each capable of establishing its own individual gear train, and one in which each positive clutch is common to no other gear train than the positive one in which it is employed.

Another object of the invention is to provide a transmission of this character in which certain of the gear trains employed include a pair of permanently meshing gears which are effective to transmit torque only when the power train with which they are associated is effective.

Still another object of the invention is to provide a transmission including a plurality of positive clutches which provide for either manual or automatic shifting successively from one gear ratio to another and in which, after each gear ratio has been established, the positive clutch associated with the previously established gear ratio is left wherever possible in the position which will be required of it when the next successive gear shift is made so that in such cases a minimum of shifting movement of the positive clutches as a whole will be required.

A still further object of the invention is to provide a transmission of the character outlined above including a countershaft which operates at all times at relatively high speeds of rotation and which, by virtue of this fact, serves to efficiently control the operation of a governor mounted thereon by means of which certain automatic speed shifting operations which may be associated with the transmission are controlled.

Other objects and advantages of the invention, not at this time specifically enumerated, will become readily apparent as the nature of the invention is better understood.

In the accompanying single sheet of drawing forming a part of this specification, one embodiment of the invention has been shown. In these drawings.

In both of the above described views, similar characters of reference have been employed to designate similar parts.

Figures 1, 2:
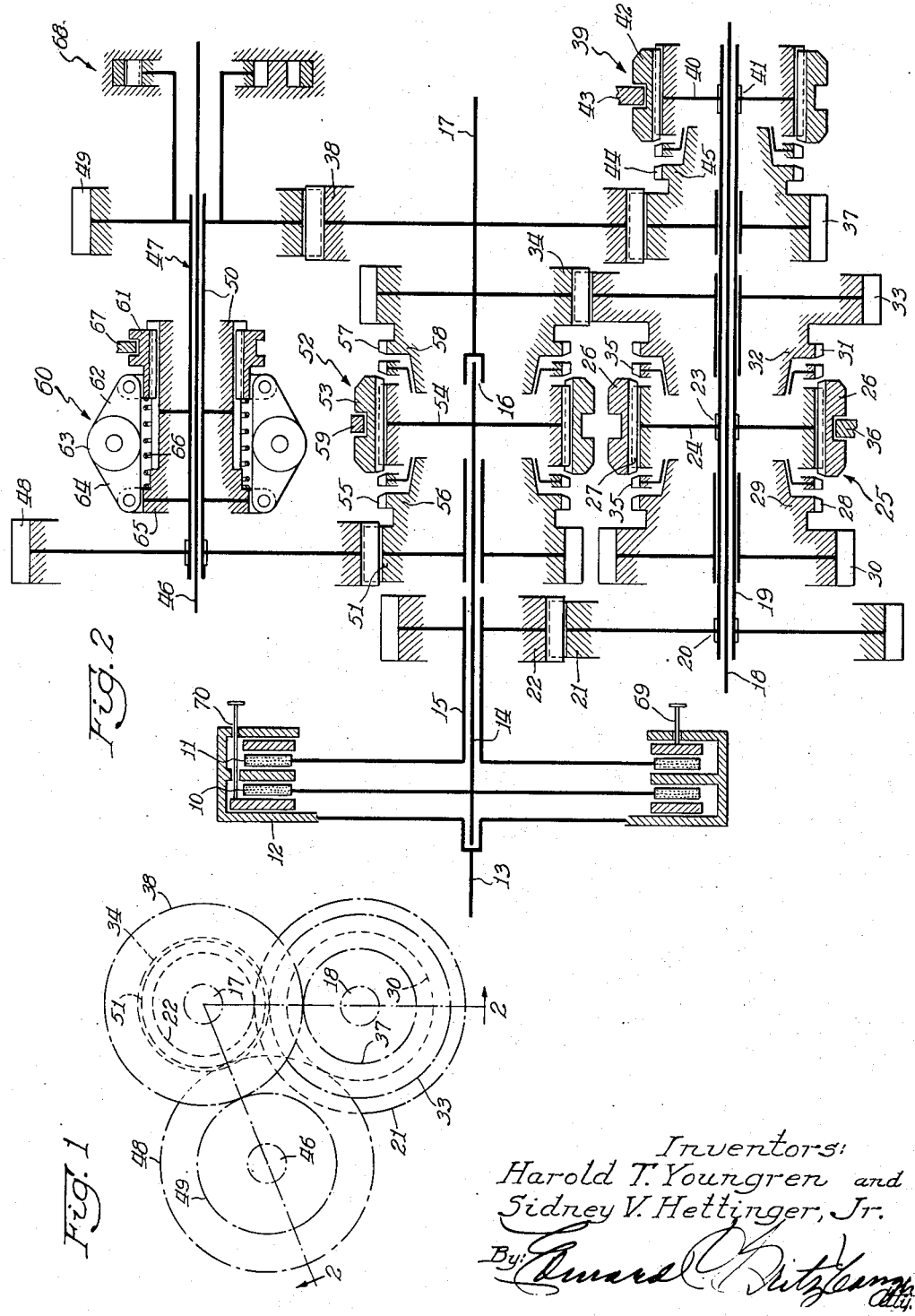
Fig. 1 is a sectional end view of a transmission constructed in accordance with the principles of the present invention.
Fig. 2 is a sectional view taken substantially along the line 2—2 of Fig. 1.

The transmission shown schematically in the drawings employs five different gear trains and will accommodate four forward speed ratios and one reverse speed ratio. The transmission requires two friction clutches, namely, a forward friction clutch 10 and a rear friction clutch 11. These clutches are associated with a flywheel assembly 12 operatively connected to the engine drive shaft 13. The friction clutches 10 and 11 are capable of being selectively actuated by suitable control mechanism (not shown) either to connect the engine driven flywheel 12 to a main shaft 14 or to a sleeve shaft 15 rotatably mounted on the main shaft 14.

The main shaft 14 is piloted as at 16 within the front end of the driven shaft 17 and the latter is adapted to be operatively connected to the drive wheels of the vehicle with which the transmission is associated.

A counter shaft 18 is provided below the main shaft 14 and has rotatably mounted thereon a countershaft sleeve 19, the countershaft itself being fixed to and mounted within the transmission casing (not shown) and thus held stationary. The counter shaft sleeve 19 has splined thereto as at 20 a gear 21 which is in constant mesh with a gear 22 formed on the sleeve shaft 15. Also splined as at 23 to the countershaft sleeve 19, and consequently rotatable therewith, is a hub 24 forming part of a speed shift conditioning and synchronizing device in the form of a positive dual clutch assembly designated in its entirety at 25. A sliding shift collar 26 having internal teeth 27 is mounted on the hub 24 and is designed for selective engagement with a series of teeth 28 provided on a hub 29 forming part of a gear 30 or with a series of teeth 31 mounted on a hub 32 forming part of a gear 33 which meshes with a gear 34 mounted on the driven shaft 17.

The gears 30 and 33 are freely rotatable upon the countershaft sleeve 19 and thus, it will be seen that when the shift collar 26 is moved to its extreme left-hand position as seen in Fig. 2, the internal teeth 27 thereof will engage the teeth 28 of the hub 29 and operatively connect the gear 30 to the sleeve 19. Similarly, when the shift collar 26 is moved to its extreme right-hand position so that the teeth 27 engage the teeth 31 on the hub 32, the gear 33 will be operatively connected to the sleeve 19.

The positive clutch assembly 25 also includes synchronizing mechanism in the form of a pair of floating rotative blocking members 35 having conical shaped surfaces which frictionaly engage mating conical surfaces on the hubs 29 and 32 of the gears 30 and 33 respectively and prevent final shifting of the collar 26 until synchronization is effected. The synchronizing mechanism per se is of conventional design and no claim is made herein to any novelty associated therewith, its function being to gradually bring the various rotative parts which are to be connected together up to the same speed of rotation prior to effecting a final shift of the collar 26. A shift fork or yoke 36 is provided for the purpose of effecting selective movement of the shift collar 26.

The countershaft sleeve 19 has rotatably mounted thereon a relatively small gear 37 which meshes with a relatively large gear 38 mounted on and fixed to the driven shaft 17. A speed shift conditioning and synchronizing device designated in its entirety at 39 in the form of a single positive clutch assembly includes a hub 40 which is splined as at 41 to the countershaft sleeve 19 and includes a shift collar 42 mounted on the hub 40 and movable by means of a yoke 43 from a disengaged position to a position wherein it is in engagement with a series of teeth 44 provided on a hub 45 formed on the gear 37. The speed shift conditioning and synchronizing device 39 is similar to the device 25 and, as a consequence, further description thereof is believed to be unnecessary. It will be seen that when the shift collar 42 is moved to its extreme left-hand position as shown in Fig. 2, it will serve to operatively connect the gear 37 to the countershaft sleeve 19 and that when it is in its extreme right-hand position, this gear 37 will be disconnected from the countershaft sleeve 19.

A second countershaft 46 is provided below the main shaft 14 and has rotatably mounted thereon a gear unit or cluster 47 including a large gear 48 and a small gear 49 connected together by a sleeve portion 50. The gear 48 is splined to the sleeve portion 50 and is in constant mesh with a gear 51 which is rotatably mounted on the main shaft 14 and the small gear 49 is in constant mesh with the previously mentioned relatively larger gear 38 carried by the driven shaft 17, this latter gear being in constant mesh with the previously mentioned gear 37 which is rotatably mounted on the countershaft sleeve 19.

A gear 51 which is rotatably mounted on the main shaft 14 and the gear 34 which is mounted on and rotatable with the driven shaft 17 are adapted to be selectively connected to the main shaft 14, each to the exclusion of the other by a speed shift conditioning and synchronizing device in the form of a positive dual clutch assembly designated in its entirety at 52. This speed shift conditioning and synchronizing device is similar in its construction to the devices 25 and 39 and includes a shift collar 53 mounted on a hub 54 designed for selective engagement with a series of teeth 55 provided on a hub 56 formed on the gear 51 or with a series of teeth 57 provided on a hub 58 formed on the gear 34. It is obvious that when the collar 53 is in its left-hand position as viewed in Fig. 2, the gear 51 will be operatively connected to the main shaft 14 and that when the collar 53 is moved to its right-hand position, the gear 34 will be operatively connected to the main shaft 14. A yoke 59 is provided for controlling the movements of the shift collar 53.

The speed shift conditioning device 25, being in the form of a dual positive clutch assembly incorporates two positive clutches, as does also the speed shift conditioning device 52. The speed shift conditioning device 39 is in the form of a single clutch assembly. The shift collars 26, 42 and 53, therefore, collectively embody five positive clutches which are employed in connection with the present invention for controlling the operation of the transmission through four forward speed ratios and one reverse speed ratio. These shift collars may be manually controlled or they may be automatically controlled by operating instrumentalities, which in turn operate under the control of any one or a combination of such factors as engine speed, the speed of the vehicle, the position of the vehicle accelerator pedal, the degree of vacuum in the intake manifold of the vehicle engine, the viscosity of the oil in the transmission housing, etc.

To effect such vehicle speed control, a governor designated in its entirety at 60 may be mounted to the gear cluster 47 as shown. The details of the governor 60 form no part of the present invention and, as shown, this governor is of conventional form and includes a sleeve member 61 which is slidably splined on the sleeve portion 50 of the gear cluster 47 and which is pivotally connected by a series of links 62 to a series of weights 63 which in turn are connected by a series of links 64 to a plurality of lugs 65 carried by the sleeve portion 50. A coil spring 66 surrounding the sleeve portion 50 maintains the slidable sleeve member 61 in its right-hand position when the gear cluster 47 is at rest. As the gear cluster 47 gathers rotational speed in the normal operation of the transmission, it will be seen that the weights 63 are forced radially outwardly under the influence of centrifugal force so as to draw the sleeve 61 to the left as shown in Fig. 2. A yoke 67 may be provided as a take-off device for transmitting the motion of the sleeve 61 to suitable transmission control mechanism (not shown). By the same token, i. e., due to the relatively high speed of rotation of the gear cluster 47 as compared to the rotative speed of the other elements of the transmission, an operating pump 68 forming part of the automatic controls for the transmission may likewise be mounted on this cluster.

In the operation of the transmission as described, low or first gear is attained by engaging the clutch 11 under the control of a suitable operating rod 69 or other clutch actuating mechanism which may be either manual or automatic. Such engagement of the clutch 11 serves to connect the sleeve shaft 15 to the flywheel 12 and cause rotation of the gear 22 and consequently of the gear 21 which meshes with it and which is mounted on the countershaft sleeve 19. The speed shift conditioning and synchronizing device 25 has its shift collar 26 disposed in a neutral position while the speed shift conditioning and synchronizing device 39 has its collar 42 shifted to the left-hand position so as to connect the gear 37 to the countershaft sleeve 19. The speed shift conditioning and synchronizing devices 25 and 39 may be actuated manually prior to engagement of the clutch 11 for shifting the transmission into first or low speed, but in general it is contemplated that such preconditioning of these devices shall take place automatically as previously set forth. The present invention is not concerned with the specific means by which the devices 25 and 39 are preconditioned preparatory to effecting a final shift in speed ratio, and it is deemed sufficient to state that, prior to any particular change in speed ratio, the desired preconditioning of the devices 25 and 39 will have automatically been effected. The speed shift conditioning and synchronizing device 52 may also be moved to the left to connect the gear 51 to the shaft 14 prior to establishment of the low speed gear train.

With the clutch 11 engaged and the gear 37 operatively connected to the countershaft sleeve 19, a drive exists from the flywheel 12 through the clutch 11, sleeve shaft 15, gears 22, 21, countershaft sleeve 19, hub 40 of the synchronizing device 39, shift collar 42 and gears 37, 38 to the driven shaft 17.

The shift from low or first gear into second gear is attained merely by engaging the friction clutch 10 and disengaging the friction clutch 11 with the speed shift conditioning and synchronizing devices 25 and 39 remaining undisturbed and in the same position which they assume in first speed driving ratio, it being assumed that the speed shift conditioning and synchronizing device 52 has been moved previously to its left-hand position. With the friction clutch 10 engaged under the influence of the operating rod 70 or other control mechanism which may be manual or automatic as desired, a drive exists from the flywheel 12 through the clutch 10, main shaft 14, shift collar 53, gears 51, 48 and gears 49, 38 to the driven shaft 17.

Prior to shifting from second speed gear ratio into third speed gear ratio and while an actual drive exists through the second speed gear ratio power train previously described, the speed ratio conditioning device 25 and the speed ratio conditioning device 39 are preconditioned by moving the shift collars 26 and 42 to the right as viewed in Fig. 2. The friction clutch 10 is disengaged and the friction clutch 11 reengaged so that a drive exists from the flywheel 12 through the clutch 11, sleeve shaft 15, gears 22, 21, countershaft sleeve 19, hub 24, shift collar 26 and gears 33 and 34 to the driven shaft 17.

A direct drive condition of the transmission which is the fourth forward gear ratio thereof is attained by a preconditioning of the speed ratio conditioning device 52 so that the shift collar 53 thereof is moved to its extreme right-hand position while an actual drive exists through the third speed gear ratio power train. The forward friction clutch 10 is then reengaged and the clutch 11 disengaged and a drive then exists from the flywheel 12 through the friction clutch 10, main shaft 14, hub 54, shaft collar 53 and gear 34 to the driven shaft 17. Because of the fact that the gear 34 which is mounted on the driven shaft 17 is operatively connected through the clutch collar 53 to the main shaft 14, a direct drive exists from the flywheel 12 through the transmission to the driven shaft 17 and a one-to-one gear ratio of the transmission obtains.

If a down-shift from fourth gear ratio to third gear ratio is in order, friction clutch 10 will be disengaged and friction clutch 11 engaged so that the previously described third speed gear ratio train will be in effect.

When the third speed power train previously described is in effect, the nature of the driving conditions encountered will determine whether the transmission shall become conditioned for establishing either the second speed power train or the fourth speed power train, and depending upon such conditions, disengagement of the clutch 11 and re-engagement of the clutch 10 will effect the described up-shift or down-shift.

Similarly, when a drive exists through the second speed gear train, the transmission is capable of being preconditioned by the requisite shifting of positive clutches for an up-shift into third speed gear ratio, or a down-shift into first speed gear ratio may take place automatically upon disengagement of the friction clutch 10 and engagement of the friction clutch 11, the condition of the various positive clutches being the same when either first or second gear ratio obtains.

Reverse drive is attained by manually preconditioning the various synchronizing and speed ratio conditioning devices to place the collars 26 and 42 in their left and right-hand positions respectively while the collar 53 of the speed shift conditioning device 52 may assume any of its three positions. The friction clutch 11 is then engaged so that a drive exists from the flywheel 12 through the clutch 11, gears 22, 21, countershaft sleeve 19, hub 24, shift collar 26, gears 30, 48, 49, 38 to the driven shaft 17 which is rotated in a reverse direction.

From the above description of the operation of the transmission, it will be seen that all of the gear shift operations during acceleration of the vehicle from a standstill to direct drive gear ratio are obtained by alternate engagement and disengagement of the two friction clutches 10 and 11. It will be understood that the preconditioning of the devices 25, 39, and 52 as well as shifting of the friction clutches 10 and 11 may take place automatically under the control of operating conditions associated with the vehicle as previously outlined above. Thus, each change in speed ratio during acceleration of the vehicle is conducted by a power shift operation, which is to say that an uninterrupted flow of power during acceleration of the vehicle throughout the various speed ratio changes is maintained. As a consequence, there is practically no loss of time from the operation of changing gear ratios as is at present consumed in the standard type of transmission and, since the synchronizing devices 25, 39 and 52 are employed, clashing of gears is substantially eliminated. The net effect of the use of a transmission such as has been described in detail above is to provide a substantially effortless means whereby the vehicle may be brought up to a desired speed in less time than is ordinarily consumed with transmissions of conventional design. It will, of course, be appreciated that the same conditions of alternate engagement and disengagement of the two clutches 10 and 11 obtain during down shifting operations with preconditioning of the synchronizing devices 25, 39 and 52 taking place automatically.

It will be seen from the above description that by virtue of the gear connection 38, 49, the gear cluster 47 will at all times rotate at a rate of speed which is directly proportional to the speed of rotation of the driven shaft 17 and this is true whether the driven shaft 17 is the recipient of torque from the flywheel 12 through the gear combination 38, 49 during operation of the vehicle in second speed gear ratio or in reverse speed gear ratio, or whether the gear cluster 47 is the recipient of reverse torque from the driven shaft 17 when the vehicle is being driven in first, third or fourth speed gear ratio. It will also be seen that by virtue of the discrepancy of size between the two gears 38 and 49, the gear cluster 47 will at all times rotate at a relatively high rate of speed as compared to the driven shaft 17. The sleeve part of the gear cluster 47 existing between the two gears 48 and 49 therefore provides a suitable place for mounting of the governor 60 and the governor when so mounted on the gear cluster 47 will be responsive to considerably smaller speed differentials of the driven shaft 17 than it would be if it were mounted directly on the shaft 17 or on any of the other shafting such as sleeve shaft 15 or the main shaft 14 in alignment therewith and, as a consequence, a governor of relatively small proportions may be employed.

What has been said in favor of mounting the governor 60 on the gear cluster 47 is equally applicable to the pump 69 and with this pump so mounted, a pump of relatively small size may conveniently be employed.

While we have described our invention in connection with one specific embodiment thereof, it is to be understood that this is by way of illustration and not by way of limitation and the scope of my invention is defined solely by the appended claims which should be construed as broadly as the prior art will permit.

We claim:

1. In a transmission, the combination of a drive shaft, a driven shaft, means providing a first speed power train between said shafts and including a positive clutch and a friction clutch connected in series, means providing a second speed power train between said shafts and including a second friction clutch and a second positive clutch connected in series, means for providing a third speed power train between said shafts and including said first friction clutch and a third positive clutch connected in series, means providing a direct drive power train between said shafts and including said second friction clutch and a fourth positive clutch connected in series for directly coupling said drive shaft to said driven shaft, and means providing a reverse drive power train between said shafts and including said first friction clutch and a fifth positive clutch connected in series, the friction clutch and the positive clutch of each power train constituting the sole engaging means for rendering the power train effective.

2. In a transmission, the combination of a drive shaft, a driven shaft, a first countershaft gear set including a plurality of gears, a second countershaft gear set including a plurality of gears, means providing a first speed power train between said shafts and including a positive clutch adapted for connecting a first pair of gears of said first countershaft gear set and a friction clutch connected in series to complete the power train, means providing a second speed power train between said shafts and including a second friction clutch and a second positive clutch connected in series and arranged to drive said second countershaft gear set to complete the power train, means for providing a third speed power train between said shafts and including said first friction clutch and a third positive clutch connected in series with said third positive clutch adapted for connecting a second pair of gears of said first countershaft gear set to complete the power train, means providing a fourth speed power train between said shafts and including said second friction clutch and a fourth positive clutch connected in series, and means providing a reverse drive power train between said shafts and including said first friction clutch and a fifth positive clutch connected in series, the friction clutch and the positive clutch of each power train constituting the sole engaging means for rendering the power train effective, each of said positive clutches upon engagement thereof serving to potentially establish its respective power train and said power train becoming established upon engagement of its respective friction clutch.

3. In a transmission, the combination of a drive shaft, a driven shaft, a first countershaft gear set including a plurality of gears, a second countershaft gear set including a plurality of gears, means providing a first speed power train between said shafts and including a positive clutch adapted for connecting a first pair of gears of said first countershaft gear set and a friction clutch connected in series to complete the power train, means providing a second speed power train between said shafts and including a second friction clutch and a second positive clutch connected in series and arranged to drive said second countershaft gear set to complete the power train, means for providing a third speed power train between said shafts and including said first friction clutch and a third positive clutch connected in series with said third positive clutch adapted for connecting a second pair of gears of said first countershaft gear set to complete the power train, means providing a direct drive power train between said shafts and including said second friction clutch and a fourth positive clutch connected in series for directly coupling said drive shaft to said driven shaft to complete the power train, and means providing a reverse drive power train between said shafts and including said first friction clutch and a fifth positive clutch connected in series, the friction clutch and the posititive clutch of each power train constituting the sole engaging means for rendering the power train effective, each of said positive clutches upon engagement thereof serving to potentially establish its respective power train and said power train becoming established upon engagement of its respective friction clutch, said first and second positive clutches being capable of simultaneous engagement whereby, upon selective engagement of said friction clutches, said first and second power trains are established respectively.

4. In a transmission, the combination of a drive shaft, a driven shaft including a gear coupled thereto, a countershaft gear set including a gear smaller than and constantly in mesh with said driven shaft gear whereby said countershaft gear set rotates faster than and at a constant ratio with respect to said driven shaft, means providing a first speed power train between said shafts and including a positive clutch and a friction clutch connected in series, means providing a second speed power train between said shafts and including a second friction clutch and a second positive clutch connected in series and arranged to drive said countershaft gear set to complete the power train, means for providing a third speed power train between said shafts and including said first friction clutch and a third positive clutch connected in series; means providing a fourth speed power train between said shafts and including said second friction clutch and a fourth positive clutch connected in series, means providing a reverse drive power train between said shafts and including said first friction clutch and a fifth positive clutch connected in series; the friction clutch and the positive clutch of each power train constituting the sole engaging means for rendering the power train effective, said second and fourth positive clutches operating under the control of a common shift member, and governing means adapted for controlling completion of at least one of said power trains and driven by said countershaft gear set whereby said governing means are responsive to the speed of said driven shaft.

5. In a transmission, the combination of a drive shaft, a driven shaft including a gear coupled thereto, a first countershaft gear set including a plurality of gears, a second countershaft gear set including a plurality of gears with one of said gears being smaller than and constantly in mesh with said driven shaft gear whereby the second countershaft gear set rotates faster than and at a constant ratio with respect to said driven shaft, means providing a first speed power train between said shafts and including a positive clutch adapted for connecting a first pair of gears of said first countershaft gear set and a friction clutch connected in series to complete the power train, means providing a second speed power train between said shafts and including a second friction clutch and a second positive clutch connected in series and arranged to drive said second countershaft gear set to complete the power train, means for providing a third speed power train between said shafts and including said first friction clutch and a third positive clutch connected in series with said third positive clutch adapted for connecting a second pair of gears of said first countershaft gear set to complete the power train, means providing a direct drive power train between said shafts and including said second friction clutch and a fourth positive clutch connected in series for directly coupling said drive shaft to said driven shaft to complete the power train, means providing a reverse drive power train between said shafts and including said first friction clutch and a fifth positive clutch connected in series, the friction clutch and the positive clutch of each power train constituting the sole engaging means for rendering the power train effective, said second and fourth positive clutches operating under the control of a common shift member and said third and fifth positive clutches likewise operating under the control of a common shift member, and governing means adapted for controlling completion of at least one of said power trains and driven by said second countershaft gear set whereby said governing means are responsive to the speed of said driven shaft.

6. In a transmission, the combination of a drive shaft, a driven shaft including a gear coupled thereto, a first countershaft gear set including a plurality of gears, a second countershaft gear set including a plurality of gears with one of said gears being smaller than and constantly in mesh with said driven shaft gear whereby the second countershaft gear set rotates faster than and at a constant ratio with respect to said driven shaft, means providing a first speed power train between said shafts and including a positive clutch adapted for connecting a first pair of gears of said first countershaft gear set and a friction clutch connected in series to complete the power train, means providing a second speed power train between said shafts and including a second friction clutch and a second positive clutch connected in series and arranged to drive said second countershaft gear set to complete the power train, means for providing a third speed power train between said shafts and including said first friction clutch and a third positive clutch connected in series with said third positive clutch adapted for connecting a second pair of gears of said first countershaft gear set to complete the power train, means providing a direct drive power train between said shafts and including said second friction clutch and a fourth positive clutch connected in series for directly coupling said drive shaft to said driven shaft to complete the power train, means providing a reverse drive power train between said shafts and including said first friction clutch and a fifth positive clutch connected in series with said fifth positive clutch adapted for connecting a third pair of gears of said first countershaft gear set and with one of said third pair of gears being in mesh with one of the gears of said second countershaft gear set to complete the power train, the friction clutch and the positive clutch of each power train constituting the sole engaging means for rendering the power train effective, said second and fourth positive clutches being capable of alternate engagement, each to the exclusion of the other, when said third speed power train is effective, and governing means adapted for controlling completion of at least one of said power trains and driven by said second countershaft gear set whereby said governing means are responsive to the speed of said driven shaft.

HAROLD T. YOUNGREN.
SIDNEY V. HETTINGER, Jr.

References Cited in the file of this patent

UNITED STATES PATENTS

| Number | Name | Date |
|---|---|---|
| 2,208,153 | Budlong | July 16, 1940 |
| 2,315,808 | Miller | Apr. 6, 1943 |
| 2,322,676 | Vincent | June 22, 1943 |
| 2,344,656 | Swennes | Mar. 21, 1944 |
| 2,386,540 | Campodonico | Oct. 9, 1945 |
| 2,466,318 | Kohe | Apr. 5, 1949 |
| 2,485,688 | Banker | Oct. 25, 1949 |

FOREIGN PATENTS

| Number | Country | Date |
|---|---|---|
| 119,098 | Great Britain | Sept. 26, 1918 |
| 232,801 | Switzerland | Sept. 1, 1944 |
| 604,178 | Great Britain | June 29, 1948 |
| 609,389 | Great Britain | Sept. 30, 1948 |

OTHER REFERENCES

Ser. No. 344,826, Kegresse (A. P. C.), published May 4, 1943.